Aug. 20, 1957  G. HOHWART ET AL  2,803,159
ARBOR
Filed Sept. 14, 1954  4 Sheets-Sheet 1
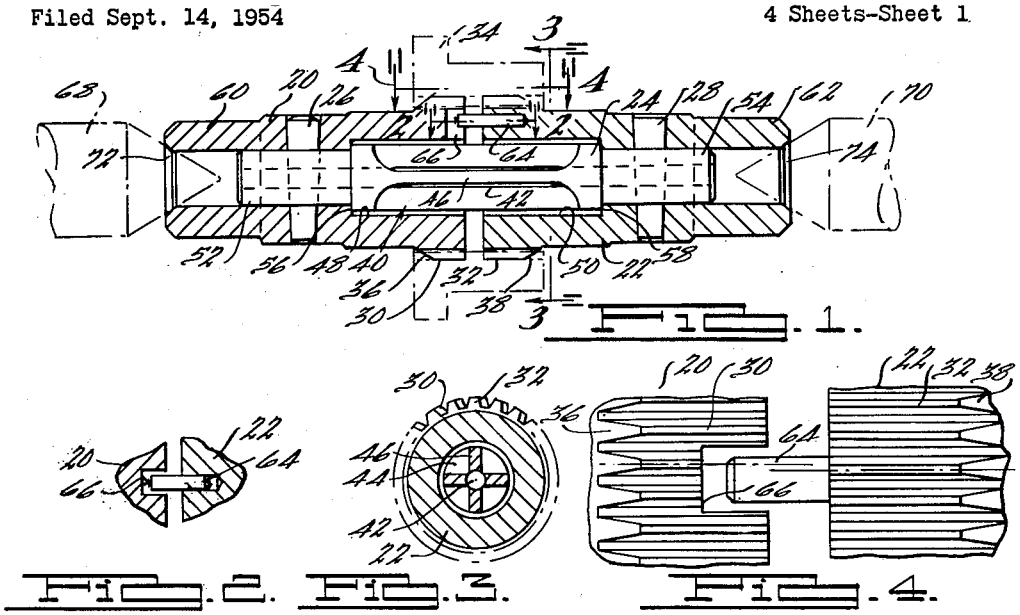
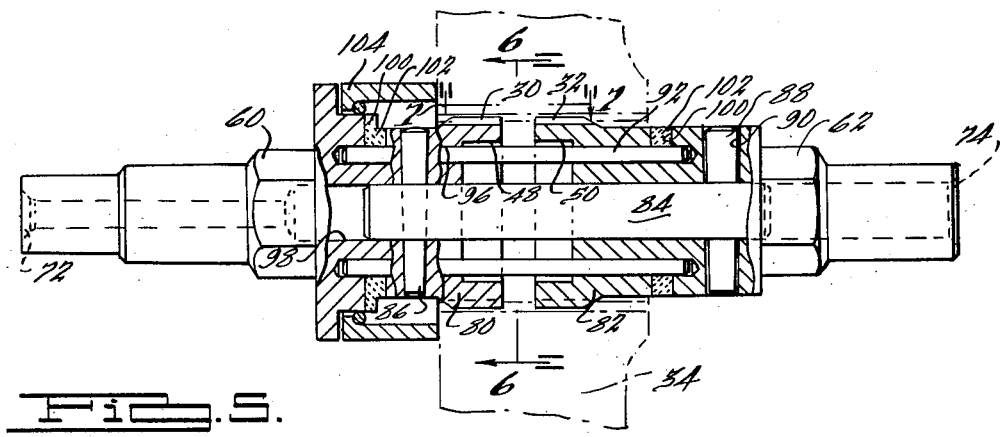
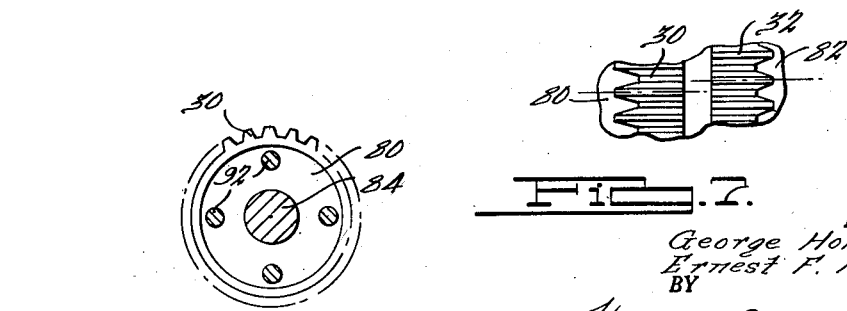
INVENTORS.
George Hohwart.
Ernest F. Hohwart.
BY
Harness, Dickey & Pierce.
ATTORNEYS.

Aug. 20, 1957 G. HOHWART ET AL 2,803,159
ARBOR
Filed Sept. 14, 1954 4 Sheets-Sheet 2

INVENTORS.
George Hohwart.
Ernest F. Hohwart.
BY
Harness, Dickey & Pierce
ATTORNEYS.

Aug. 20, 1957  G. HOHWART ET AL  2,803,159
ARBOR
Filed Sept. 14, 1954  4 Sheets-Sheet 3

INVENTORS.
George Hohwart.
Ernest F. Hohwart.
BY
Harness, Dickey & Pierce,
ATTORNEYS.

Aug. 20, 1957  G. HOHWART ET AL  2,803,159
ARBOR
Filed Sept. 14, 1954  4 Sheets-Sheet 4
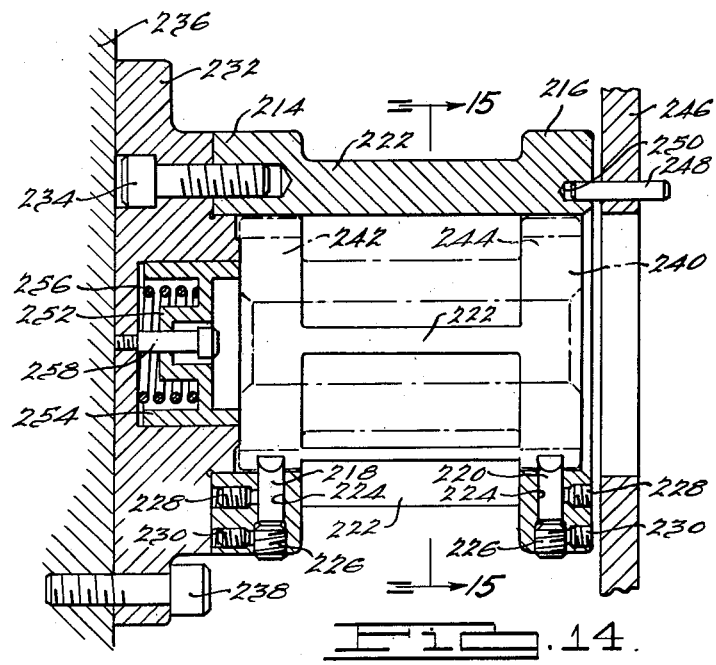
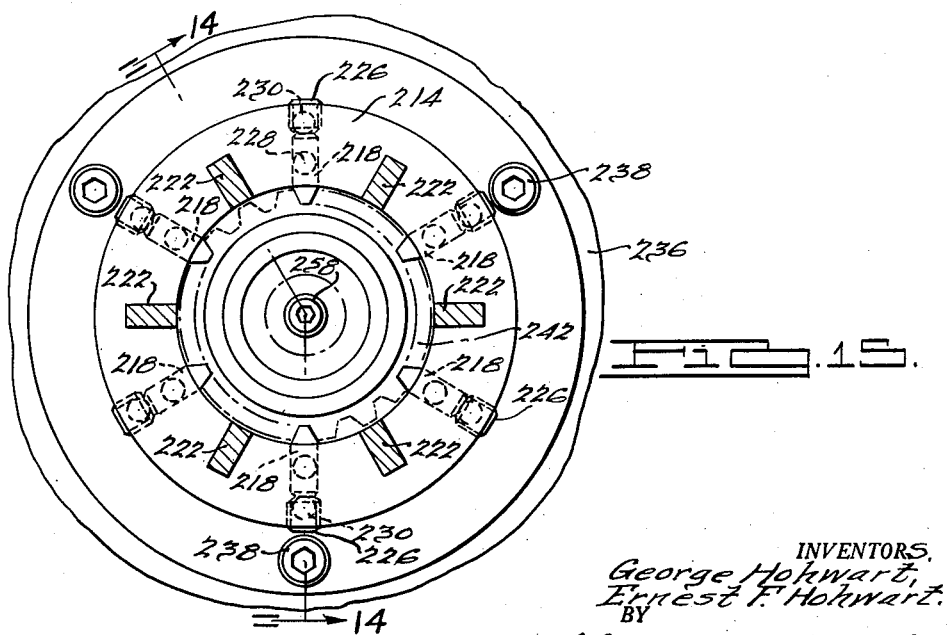
INVENTORS,
George Hohwart,
Ernest F. Hohwart.
BY
Harness, Dickey & Pierce
ATTORNEYS.

United States Patent Office 2,803,159
Patented Aug. 20, 1957

2,803,159
ARBOR

George Hohwart, Farmington Township, Oakland County, and Ernest F. Hohwart, Detroit, Mich., assignors to N. A. Woodworth Company, Ferndale, Mich., a corporation of Michigan Application September 14, 1954, Serial No. 456,158

23 Claims. (Cl. 82—43)

This invention relates broadly to new and useful improvements in arbor chucks and more particularly to an arbor chuck for clamping a splined workpiece.

This application is a continuation-in-part of our co-pending application Serial No. 390,392, filed November 5, 1953, now abandoned.

An important object of the invention is to provide a chuck of the above-mentioned character that clamps a workpiece solidly and holds it centered on the chuck.

Another object of the invention is to provide an arbor chuck that is uniquely constructed to clamp and securely hold relatively short workpieces.

Still another object of the invention is to provide an arbor chuck that is relatively simple in construction and correspondingly inexpensive to manufacture.

Yet another object of the invention is to provide an arbor chuck that can be made in both large and small sizes and that is equally effective to clamp workpieces of various sizes.

Other objects and advantages of the invention will be apparent during the course of the following description.

In the drawings forming a part of this specification and wherein like numerals are employed to designate like parts throughout the same:

Fig. 1 is a longitudinal sectional view through an arbor chuck embodying the invention;

Fig. 2 is a fragmentary, transverse sectional view taken on the line 2—2 of Fig. 1;

Fig. 3 is a transverse sectional view taken on the line 3—3 of Fig. 1;

Fig. 4 is an enlarged, fragmentary, plan view looking in the direction of the arrows 4—4 in Fig. 1;

Fig. 5 is a longitudinal, sectional view through an arbor chuck of modified construction embodying the invention;

Fig. 6 is a transverse sectional view taken on the line 6—6 of Fig. 5;

Fig. 7 is a fragmentary plan view looking in the direction of the arrows 7—7 of Fig. 5;

Fig. 14 is a longitudinal sectional view taken on the line 14—14 of Fig. 15 and illustrating an arbor chuck adapted to receive and clamp an externally splined workpiece; and Fig. 15 is a transverse sectional view taken on the line 15—15 of Fig. 14.

Figure 8:
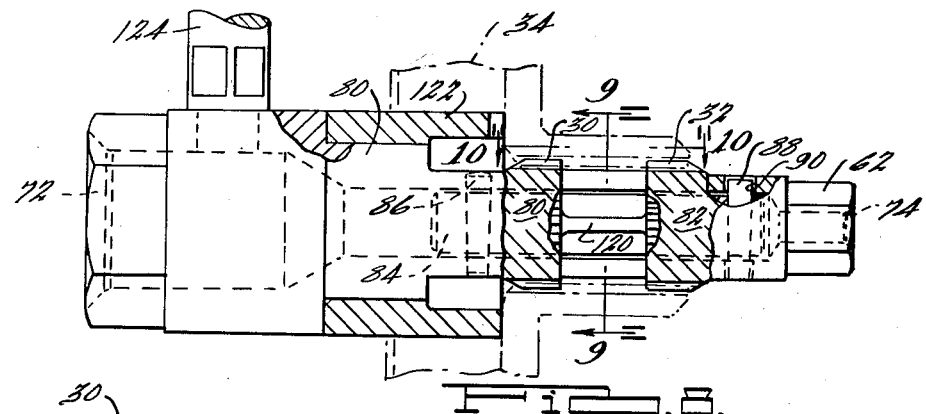
Fig. 8 is a longitudinal sectional view through another modified form of the invention.

The arbor chuck illustrated by Figs. 1–4 comprises a pair of corresponding, tubular sections 20 and 22 mounted on and held in coaxial relation by a central shaft 24. Cross pins 26 and 28 extending transversely through the arbor sections 20 and 22 and the terminal portions of shaft 24 hold the arbor sections securely on the shaft and in predetermined circumferentially adjusted relation with respect to each other. The adjacent ends of the arbor sections 20 and 22 are spaced slightly apart, and the inner terminal portions thereof are formed with external splines 30 and 32 which normally are offset slightly circumferentially with respect to each other.

In use the splines 30 and 32 are brought into alignment by torsionally deflecting the shaft 24, and an internally splined workpiece 34, such as the one illustrated by broken lines in the drawing, is slipped onto the arbor with the internal splines thereof around and in engagement with the splines 30 and 32. In order to facilitate application of the workpiece 34 to the arbor and removal thereof from the arbor, the external splines 30 and 32 preferably are larger in diameter than the main body portions of the arbor sections 20 and 22. It will be readily apparent, in this connection, that each arbor of the type here shown is adapted to co-operate with workpieces of predetermined size and having internal splines of predetermined size and number. Accordingly, the external splines 30 and 32 are formed to interengage properly with the internal splines of the workpiece 34 and, if desired, the outer ends of the splines can be tapered as at 36 and 38 to assist in guiding the workpiece onto the splines.

In order to achieve a controlled rate of torsional deflection in the shaft 24 and at the same time maintain an adequate holding force against the workpiece 34, the middle portion 40 of the shaft is uniquely formed to provide the necessary flexibility and resiliency. The amount of offset normally obtaining between the splines 30 and 32 is such that the workpiece 34 cannot be engaged with both of the splines when the sections 20 and 22 are in their normal position. In order to engage the workpiece 34 with both of the splines 30 and 32 it is necessary to turn one of the arbor sections with respect to the other sufficiently to bring the splines substantially into alignment. Inasmuch as this is accomplished according to the present invention, by torsionally flexing the resilient shaft section 40, it will be apparent that this section of the shaft must be sufficiently resilient to permit alignment of the splines 30 and 32 without causing a permanent set or distortion in the shaft. After the workpiece 34 has been engaged with the splines 30 and 32, the resilient shaft portion 40 presses the respective splines in opposite directions against the internal splines of the workpiece and, by reason of the pressure between the external and internal splines, holds the workpiece securely on the arbor. Manifestly, the force with which the workpiece 34 is held on the arbor depends upon the amount of initial offset between the splines 30 and 32 and upon the resistance offered by the resilient shaft portion 40 to torsional distortion. These factors can be controlled by means well known to the art in accordance with the exigencies of the particular situation. It is essential, of course, that the arbor hold the workpiece 34 immovable under the actual conditions of use. Usually an arbor chuck of the type here under consideration is intended to be used to hold a workpiece while a machining or other operation is performed thereon, and the arbor must hold the workpiece absolutely stationary during this operation. After the workpiece has been removed from the arbor, the resilient shaft portion 40 must again return the arbor sections to their initial offset position.

From the foregoing it will be readily appreciated that the flexible middle portion 40 of the shaft 24 is in effect a torsion bar and there are a number of different forms that the torsion portion of the bar can assume. The particular form here shown, however, has been found to be pre-eminently satisfactory and to be superior in many respects to various otherwise equivalent constructions. Specifically, the torsion section 40 here shown is formed by drilling a central bore 42 through the shaft 24 and milling a plurality of longitudinal slots 44 (Fig. 3) in circumferentially equidistant relation around the shaft 24. The slots 44 extend radially inwardly to the bore 42 and define intermediate, radial reeds 46 which provide the essential flexibility and resiliency. As a practical matter, the section 40 cannot be so stiff that excessive force is required to move the splines 30 and 32 into alignment; but on the other hand, the section must offer substantial resistance to torsional deflection so as to assure adequate holding force when the workpiece is engaged with the splines 30 and 32. By selectively controlling the number and size of the slots 44 and accordingly the sizes of the reeds 46 as well as the nature of the material from which the shaft 24 is made, exactly the right conditions of flexibility and resiliency can be obtained.

In order to adapt the arbor for relatively short workpieces of the type here shown it is necessary to position the splines 30 and 32 relatively close together. On the other hand, in order to obtain the necessary flexibility and resiliency in the shaft 24, it is necessary to make the torsion section 40 thereof relatively long. Manifestly, these two concepts are fundamentally incompatible. They have, however, been reconciled in the instant construction by providing relatively deep central recesses 48 and 50 centrally in the inner confronting end faces of the arbor sections 20 and 22. These recesses are larger in diameter than the shaft 24 so as to permit free flexure of the resilient reed members 46. The main portion of the torsion section 40 is thus accommodated within the recesses 48 and 50 and the dimension between the bottoms of these recesses can be relatively long while maintaining the external splines 30 and 32 close together. The terminal portions 52 and 54 of the shaft 24 preferably are smaller in diameter than the main body of the shaft and the annular shoulders 56 and 58 thus provided seat against the bottoms of the recesses 48 and 50 to determine the relative longitudinal spacing between the splines 30 and 32.

In order to facilitate flexure of the arbor to bring the splines 30 and 32 into alignment, the terminal portions 60 and 62 of the arbor sections 20 and 22 are formed with external, opposed flats which form wrench-receiving faces. Of course, any noncircular form is suitable for the terminal portions 60 and 62, but they preferably are hexagonal in form. The arbor can be flexed merely by applying wrenches to the opposite ends 60 and 62 thereof and twisting them in opposite directions. However, the preferred way is to provide a table fixture (not shown) having a stationary base plate provided with an opening which receives and snugly fits one terminal portion of the arbor. When a fixture of this type is provided, the arbor is disposed upright on the table fixture, and the workpiece is slipped downwardly onto the arbor. The internal splines of the workpiece mesh with the external splines of the upper arbor section and the workpiece rests upon the upper end of the lower arbor section. A suitable wrench is then applied to the terminal of the upper section and the latter is twisted against the action of the torsion section 40 until the splines of the two arbor sections are substantially in alignment. The workpiece then drops or can be easily pushed onto the spline teeth of the lower section. The wrench is then released and the torsion section 40 tends to return the upper arbor section to its initial position. This causes the arbor splines 30 and 32 to press in opposite directions against internal splines of the workpiece whereby to hold the latter securely and immovably on the arbor.

Suitable means preferably are provided for limiting relative rotational movement between the arbor sections 20 and 22 so as to prevent overstressing the flexible and resilient reed members 46. In the form of the invention shown, this means is in the form of a pin 64 embedded in the inner end of the arbor section 22 and a radial slot 66 in the confronting end face of the adjacent arbor section 20 which receives the projecting end of the pin. As shown in Figs. 2 and 4, the slot 66 is wider than the pin 64, and the two arbor sections 20 and 22 therefore are free to rotate relative to each other within limits defined by the slot 66. Engagement of the pin 64 with one side or the other with slot 66 limits relative rotational movement between the arbor sections 20 and 22 and thus prevents overstressing reed members 46.

It is contemplated that the arbor be adapted for mounting in any suitable or conventional manner that will permit a desired operation to be performed on the workpiece 34. The particular arbor here shown is adapted for mounting between centers 68 and 70, and the internal bores of the arbor sections preferably are beveled as at 72 and 74 to accommodate the centers. If one of the centers 68 and 70 is a live center, a conventional driving arm and dog (not shown) can be provided in the usual manner to establish a driving connection between the center and the arbor.

A primary advantage of the arbor construction set forth above is that a number of different size arbors can be made from a relatively small number of stock parts. Identical shafts 24 can be used for all sizes of arbors. It is merely necessary to provide all of the different size arbor sections with a standard central bore that properly fits the terminal portions of the shaft 24 and with central recesses corresponding to the recesses 48 and 50 for receiving the radially enlarged torsion section 40. When these conditions obtain, any pair of companion arbor sections can be mounted on any one of a large number of stock shafts 24, and the assembly is completed merely by securing the arbor sections to the shaft by cross pins such as the ones 26 and 28 here shown. It will thus be apparent that this particular construction facilitates manufacture of the arbor and permits the manufacturer to easily make and assemble a relatively large number of arbors which vary considerably in size and form.

The form of the invention shown in Figs. 5, 6, and 7 is generally similar in construction and operation to the form first described. Accordingly, similar parts of the two chucks are designated by corresponding reference numerals and only the distinguishing structure of the latter species is described in detail.

Specifically, the modified chuck comprises a pair of arbor sections 80 and 82 that are similar in all practical and significant respects to the arbor sections 20 and 22 shown and described in connection with the first form of the invention. In this case, however, the arbor sections 80 and 82 are mounted on a straight, cylindrical shaft 84. The arbor section 80 is fastened securely to the shaft 84 by a cross pin 86, and the arbor section 82 is fastened loosely to the shaft by a cross pin 88. In this connection it will be observed that the arbor section 80 is held immovable on the shaft 84 by the cross pin 86. However, the transverse hole 90 in arbor section 82 which receives the cross pin 88 is larger in diameter than the cross pin so that the arbor section 82 is permitted to rotate on the shaft 84 within limits defined by the oversize hole 90.

In this form of the invention, the means for resisting relative rotative movement between the arbor sections is not incorporated in the central supporting shaft of the arbor as in the first form of the invention. Rather it takes the form of an annular series of flexible and resilient pins or reeds 92 arranged concentrically around and spaced radially outwardly from the shaft 84 and with the opposite end portions thereof embedded in respective arbor sections 80 and 82. In practice, each of the arbor sections 80 and 82 is provided with a plurality of longitudinal bores or sockets 96 around a central bore 98 thereof, and a radial passage 100 is provided between the periphery of the section and each of the bores 86. When assembling the chuck, the reeds 92 are inserted into the bores 96, as illustrated in Fig. 5, and the two chuck sections 80 and 82 are pushed together until they are the desired distance apart. Molten metal such as weld material 102 is then placed in the radial passages 100. This weld material bonds securely to the reeds 92 and holds the same securely and immovably associated with the arbor sections 80 and 82. Any desired number of reeds 92 can be provided. Four such reeds are here shown.

In practice, the bores 96 are so located in their respective arbor sections 80 and 82 that the reeds 92 hold the external splines 30 and 32 rotatably offset a desired amount, as shown in Fig. 7, and as described in connection with the first form of the invention. Also, it will be observed that the confronting inner ends of the arbor sections 80 and 82 are provided with central recesses 48 and 50 and that the reeds 92 are disposed in these recesses so that the portions of the reeds 92 available for flexing are relatively long while at the same time the external splines 30 and 32 of the sections are maintained relatively close together.

If desired, the two arbor sections 80 and 82 can be rotated to bring the splines 30 and 32 into alignment in the same manner as the form of the invention first described. In the modified construction, however, the workpiece 34 is permitted to drop onto a stop 104 on the arbor section 80. If a table fixture of the type hereinabove described is used, the arbor section 80 is inserted in the base plate. The workpiece 34 is dropped onto the fixture, and a wrench is applied to the upper section 82. When the wrench is turned to rotate the upper section 82 on shaft 84 against the action of reeds 92 so as to bring the splines 30 and 32 into alignment, the workpiece drops onto the lower arbor section 80 and against the stop 104. When the wrench is released, reeds 92 tend to return the upper arbor section 82 to its initial position and in doing so press the splines 30 and 32 in opposite directions against the internal splines of the workpiece to clamp the latter securely on the arbor.

Figure 9:
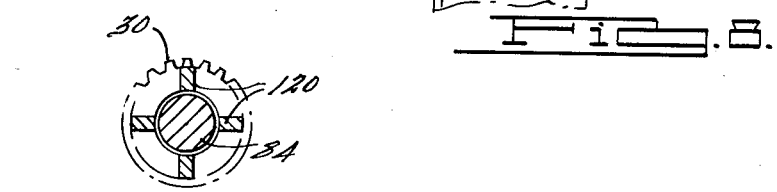
Fig. 9 is a transverse sectional view taken on the line 9—9 of Fig. 8.
Figure 10:
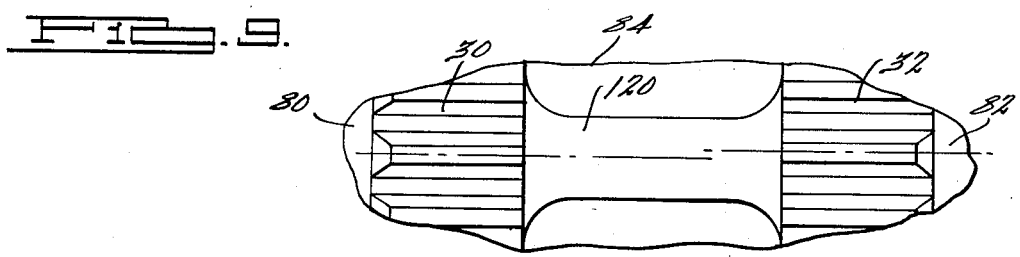
Fig. 10 is an enlarged, fragmentary plan view looking in the direction of the arrows 10—10 in Fig. 8.

The form of the invention shown in Figs. 8, 9, and 10 is generally similar to the form of the invention shown in Fig. 5, and the same reference numerals are employed to designate corresponding parts of the two species. In the form of the invention shown in Fig. 8, reeds 120 which are integral with the arbor sections 80 and 82 are used instead of the separate reeds 92 and a stop 122 which is integral with the arbor section 80 is employed in place of the separate stop previously used. This construction has the disadvantage that the arbor sections 80 and 82 must be spaced farther apart in order to make the integral reeds 120 sufficiently long to serve their intended purpose; however, it has the advantage of using a stronger reed construction and it may be preferred for this reason in situations where the wider spacing of the arbor sections is not significant. In this form of the invention the arbor section 80 is shown equipped with a conventional driving arm 124 that co-operates with the driving dog conventionally carried by the live center of a lathe or the like to rotatively drive the arbor and the workpiece 34 carried thereby.

Figure 11:
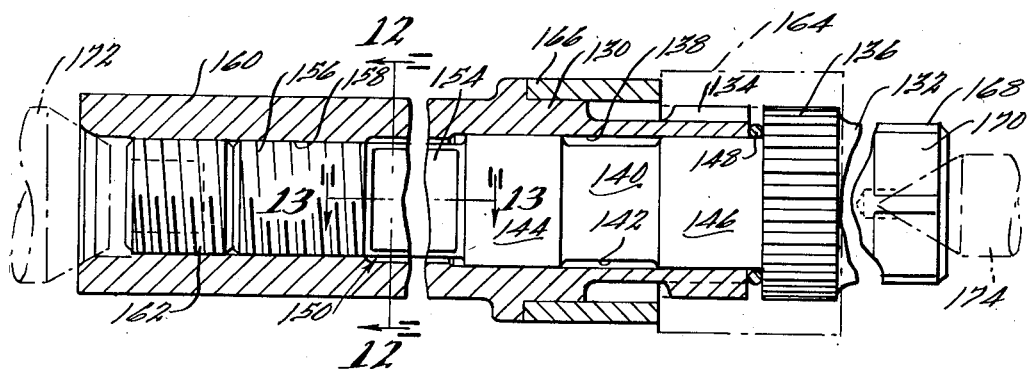
Fig. 11 is a longitudinal sectional view showing still another modified form of the invention.
Figure 12:
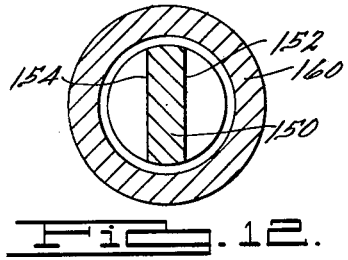
Fig. 12 is a transverse sectional view taken on the line 12—12 of Fig. 11.
Figure 13:
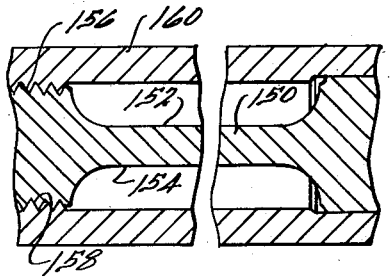
Fig. 13 is a fragmentary, longitudinal sectional view taken on the line 13—13 of Fig. 11.

The form of the invention shown in Figs. 11, 12, and 13 comprises a pair of companion arbor sections 130 and 132 having corresponding external splines 134 and 136 respectively. A central cylindrical bore 138 in arbor section 130 extends from the inner end thereof and receives a shaft 140 formed centrally on and extending longitudinally from the inner end of arbor section 132. The shaft 140 preferably is reduced in diameter as at 142 intermediate the ends thereof to provide a pair of spaced journals 144 and 146 which engage and snugly fit the cylindrical wall of the bore 138 to support the arbor section 132 for rotative movement relative to the arbor section 130. If desired, grease can be packed in the internal annular recess defined by the reduced central portion 42 to lubricate the journals 144 and 146. An O ring 148 surrounding the outer journal 146 and confined between the inner confronting end faces of the arbor sections 130 and 132 spaces the sections properly apart and also forms a seal which prevents dirt and the like from gaining access to the journal 146.

According to the present invention the portion of the shaft 140 extending beyond the inner journal 144 is formed to provide a torsion bar 150. In the particular construction here shown by way of illustration, the torsion bar is formed by cutting away opposite sides of the shaft to provide flat, parallel sides 152 and 154 (Fig. 13) and an intermediate portion in the form of a flat, narrow bar that can be torsionally twisted or distorted with relative ease. At the same time, however, the bar 150 is inherently resilient so that it returns to its initial position each time it is distorted provided, of course, it is not twisted beyond its elastic limits. The torsion bar 150 can be made of any desired length and of any suitable thickness that will provide the desired qualities of flexibility and resiliency.

At the distal end of the torsion bar 150 is an integral, externally threaded stud 156 which is screwed into an internally threaded bore 158 in a shank 160 of the arbor section 130. As perhaps best shown in Fig. 11, the internally threaded shank 160 extends beyond the stud 156 and the extending portion thereof carries a lock screw 162. When the lock screw 162 is tightened against the end of stud 156, it binds the external threads of the latter against the internal threads of the shank 160 and effectively prevents further rotation of the stud. In this manner the outer or distal end of the torsion bar 154 is defectively anchored or held against rotation in a direction to tighten the stud 156 in the shank 160. However, the arbor section 132 can still be rotated relative to the companion arbor section 130 within limits permitted by the torsion bar 154.

In practice, the splines 134 and 136 are cut simultaneously with the two arbor sections 130 and 132 held securely together by the lock screw 162. Thereafter, the lock screw 162 is backed away to release the stud 156 and the arbor section 132 is rotated relative to arbor section 130 in a counterclockwise direction as viewed in Fig. 12 to achieve any desired degree of mismatch between the splines 134 and 136. Lock screw 162 is then tightened solidly against the end of stud 156 to lock the end of shaft 140 securely against further rotation.

In use, the chuck functions in substantially the same way as the chucks previously described. To load a workpiece such as the one shown at 164 on the chuck, it is necessary merely to slip the workpiece onto the splined section 136 and then rotate arbor section 132 in a clockwise direction as viewed in Fig. 12 sufficiently to bring the splines 136 into alignment with the splines 134 so that the workpiece can be advanced onto the splines 134. Manifestly, rotation of the arbor section 132 in the manner described tends to advance or screw the stud 156 into the shank 160; and since advancement of the stud is prevented by the lock screw 162, the relative rotation between the arbor sections is accomplished by torsionally distorting the bar 150. Thereafter, when arbor section 132 is released, torque created in the torsion bar 150 attempts to return arbor section 132 rotatably to its initial position and thus effectively locks the workpiece 164 on the arbor.

If desired, the shank 160 can be formed with hexagonal external surfaces in the same manner as the arbors just described in order to adapt it for mounting in a table fixture preparatory to loading workpieces thereon. Also, the arbor section 132 can be provided with a stop 166 similar to the stop 104 in the form of the invention shown in Fig. 5 to position the workpiece axially on the arbor. If necessary or desirable, suitable means such as those shown in connection with the species first described can be provided for limiting the amount of torsional deflection of the bar 150.

The form of the invention last described is exceedingly versatile and can be readily adapted to a wide variety of workpieces. For instance the arbor can be adapted to a workpiece having a closed end merely by terminating the outer end of arbor section 132 flush or substantially flush with the splines 136. When this is done it may be necessary to place a wrench on the workpiece in order to rotate arbor section 132 sufficiently to bring splines 136 into alignment with splines 134. However, this can be done without difficulty, and after the splines are aligned the workpiece can be pushed onto the other set of splines 134. Thereafter, release of the workpiece locks it securely on the arbor. Alternatively, the arbor section 132 could be rotated to bring the splines 134 and 136 into alignment by means of a suitable actuator affixed to the shaft 140 to the right of the torsion bar 154, as viewed in Fig. 11, and extending outwardly through a transverse slot in the arbor section 130.

Also, the arbor here under consideration can be adapted for workpieces having a partially closed end by making the outer shank portion 168 relatively small in diameter. Regardless of size, the terminal portion of the shank 168 preferably is provided with wrench-receiving faces 170 for use in loading and unloading workpieces. When arbor section 132 is provided with the terminal shank portion 168 the arbor can be readily adapted for mounting between centers 172 and 174 in the same manner as the forms of the invention previously described as illustrated in Fig. 11. However, if the terminal portion 168 is omitted as when the device is adapted for closed-end workpieces and it is desired to mount the arbor between centers it is necessary to provide the workpiece with a center receiving recess or to provide the workpiece with an adapter having a center receiving recess. It will be apparent that the shank 160 can be equipped with any suitable or conventional driving arm that will co-operate with the driving dog on a lathe or the like to rotatively drive the arbor.

Figs. 14 and 15 illustrate a modified construction of the invention adapted to receive and clampingly engage an external gear or any externally splined workpiece. The construction here shown particularly illustrates how the concept of this invention can be applied to a workpiece of this type and does not in any way limit the scope of the application. It will be readily apparent that the principles embodied in most if not all of the modifications heretofore shown and described can be adapted to and incorporated in a chuck for external gears or externally splined workpieces. The particular species or form of the invention here under consideration merely illustrates these principles incorporated in one form of external arbor chuck.

More specifically, the chuck now being described comprises a pair of spaced, annular members 214 and 216 having internal toothed pins or splines 218 and 220 respectively and connected by a plurality of circumferentially spaced, flexible and resilient reeds 222. In this connection, however, it will be readily understood that each of the members 214 and 216 can be provided with any desired number of pins 218 and 220. It is desirable to have at least two and preferably three pins for each of the members 214 and 216, but the specific number may vary considerably depending upon the exigencies of the particular situation. In the form of the invention shown, the member 214 is provided with six pins 218 and the member 216 is provided with six pins 220. Similarly, any desired number of reeds 222 can be provided, and here again the number may vary depending upon the particular construction of the chuck and upon the type and size of chuck being manufactured. The instant embodiment provides six reeds 222 spaced equidistantly around the members 214 and 216 and the reeds are generally staggered with respect to the two sets of pins 218 and 220. When the reeds 222 are relaxed, they hold the pins 218 offset slightly with respect to corresponding pins 220, and the arrangement is such that the pins 220 can be brought into alignment with the pins 218 by torsionally deflecting the reeds 222.

The pins 218 and 220 can be formed integrally with the chucking members 214 and 216 or they can be made separate therefrom as shown in the drawing. Separately mounted pins are preferred so that they can be individually adjusted to a particular workpiece and so that, if desired, the pins can be replaced in order to permit the use of different pins for different workpieces and to provide for the renewal of pins that have become damaged or broken in use. The pins here shown are generally cylindrical in form and are inserted in radial openings 224 provided in the members 214 and 216 with the toothed inner ends thereof projecting radially inwardly of the members. Each pin is adjusted axially by a set screw 226 threaded into the outer end of the opening 224, and after the axial adjustment has been made the pin is locked in the adjusted position by a set screw 228 and the set screw 226 is locked in position by a set screw 230.

Various means may of course be provided for mounting and operating the chuck. No attempt is made here to define or describe all the different possible ways of mounting the chuck. Indeed, these means may vary widely, and in most instances will depend, to some extent, at least, upon related circumstances such as the size and type of workpiece to be used in the chuck. In the form of the invention here shown by way of illustration, member 214 is fastened to a mounting plate 232 by screws 234, and the latter in turn is fastened to a suitable base structure 236 by screws 238. The latter may be vertical or horizontal and is here shown extending vertically.

The workpiece 240 here shown is in the form of a double gear having similar gear portions 242 and 244 at opposite ends thereof. In use, one gear section 242, for example, is pushed into the chuck past the outer pins 220 and onto, or at least into alignment with, the inner pins 218. The outer chuck member 216 is then torsionally deflected or twisted against the action of the reeds 222 to bring the pins 220 into alignment with the pins 218 so that the two gear sections 242 and 244 can be pushed onto the pins. Any suitable means such as a spanner wrench 246 can be used to operate the chuck for loading. The wrench 246 here shown has pins 248 which fit into sockets 250 provided in the outer face of the arbor section 216. After the desired machining or other operation has been performed on the workpiece 240, the latter is removed from the chuck by reversing the loading operations. The outer chuck member 216 is torsionally deflected so that the pins 220 carried thereby release the gear section 244 and the workpiece is then removed from the chuck or at least disengaged from the clamping pins 218 and 220. After the workpiece 240 disengages the pins 218 and 220 it can be easily removed from the chuck.

If desired, suitable means may be provided for ejecting the workpiece from the chuck. An ejector is provided in the form of the invention here shown, and it comprises a cylindrical part 252 slidably mounted in a recess 254 provided centrally in the mounting plate 232. The member 252 normally is projected beyond the mounting plate by a spring 256 within limits permitted by a stop 258. In the extended position, the member 252 is engaged by the workpiece 240 when the latter is inserted in the chuck, and when the workpiece is fully inserted the member 252 is fully retracted as shown in the drawing. Thereafter, when the chuck is operated to disengage the workpiece the confined spring 256 pushes the member 252 forwardly to disengage the workpiece from the clamping pins 218 and 220.

It will be readily appreciated in connection with the foregoing that the important thing in so far as the present invention is concerned is that the pins 220 be normally offset with respect to the gear teeth or splines 244 when the companion section 242 is engaged by the pins 218. Thus, if the gear section 244 had a different number of teeth than the gear section 240 it might be necessary to provide the front chuck member 216 with a different number of pins than the rear chuck section 214 and to space the two sets of pins differently around their respective members. In this situation the front set of pins 220 would not necessarily be offset with respect to the rear set of pins 218 when the chuck is in the normal relaxed position, but rather would be offset with respect to the teeth or splines of the workpiece to be engaged thereby when the workpiece is in engagement with the pins 218. It is of course necessary in every instance that the pins 220 be brought into alignment with the teeth or splines of the workpiece by flexure of the reeds 222 so that the latter are effective to clamp the workpiece.

Having thus described the invention, we claim:

1. An arbor for chucking an internally splined part comprising a pair of externally splined sections adapted to interfit with the splines on said part, means carrying said sections holding the same in axial alignment and permitting limited rotation therebetween, and torsionally distortable resilient means holding said sections with the external splines thereof normally offset so that both sets of external splines cannot normally be engaged simultaneously with the internal splines of said part, said means being torsionally yieldable to bring said external splines sufficiently into alignment to interfit simultaneously with said internal splines and thereafter being operable by inherent resiliency to press the external splines of said sections oppositely against said internal splines to hold said part securely but releasably associated with said arbor.

2. An arbor for chucking internally splined parts comprising a pair of coaxially disposed externally splined sections disposed relatively close together and having spaced confronting end faces provided with opposed central recesses, and means interconnecting said sections holding the same in axial alignment and permitting at least limited rotational movement of one section relative to the other, said means including torsionally distortable resilient means yieldably resisting relative rotational movement between said sections, said resilient means being located in the recesses of the sections so that the effective portions thereof available to resist relative rotational movement between the sections is relatively long.

3. An arbor for chucking an internally splined part comprising a pair of axially aligned externally splined sections, a shaft interconnecting and fixed to said sections holding the latter with the external splines thereof normally offset so that both sets of external splines normally can not be engaged simultaneously with the internal splines of said part, said shaft having a torsionally distortable resilient portion which is torsionally yieldable to bring said external splines sufficiently into alignment to interfit simultaneously with said internal splines and thereafter is operable by inherent resiliency to press said external splines oppositely against said internal splines to hold said part securely but releasably on said arbor.

4. An arbor for chucking internally splined parts comprising a pair of axially aligned externally splined sections having spaced confronting end faces provided with opposed central recesses, a shaft interconnecting and fixed to said sections extending axially through and spaced circumferentially from said recesses, the portion of said shaft extending between the sections being torsionally distortable and resilient so as to hold the sections normally in predetermined rotational position relative to each other but permitting one section to move for a limited distance rotationally relative to the other.

5. An arbor for chucking internally splined parts comprising a pair of axially aligned, etxernally splined sections having spaced confronting end faces provided with opposite central recesses, a shaft interconnecting and fixed to said sections extending axially through and spaced circumferentially from said recesses, the portion of the shaft disposed between said sections having a plurality of circumferentially spaced, longitudinal slots defining torsionally distortable and resilient members, said members normally holding the splines of the section in offset relation but being yieldable to permit sufficient relative rotation between the sections to bring said splines into alignment so as to permit an internally splined workpiece to be slipped onto the arbor and thereafter operative to hold the external splines of the respective sections in pressed engagement with opposite sides of said internal splines.

6. An arbor for chucking internally splined parts comprising a pair of axially aligned, externally splined sections having spaced confronting end faces provided with opposite central recesses, a shaft interconnecting and fixed to said sections extending axially from the bottoms of said recesses and having a plurality of circumferentially spaced, longitudinal slots defining torsionally distortable and resilient members, said members normally holding the splines of the section in offset relation but being yieldable to permit relative rotation between the sections to bring said splines into alignment so as to permit an internally splined workpiece to be slipped onto the arbor, said members being thereafter operative to hold the external splines of the respective sections in pressed engagement with opposite sides of said internal splines, and means for preventing relative rotation between said sections beyond the elastic limits of said resilient members.

7. An arbor for chucking internally splined parts comprising a pair of axially aligned, externally splined sections having spaced confronting end faces provided with opposite central recesses, a shaft interconnecting and fixed to said sections extending axially through and spaced circumferentially from said recesses, the portion of the shaft disposed between said sections having a plurality of circumferentially spaced, longitudinal slots defining torsionally distortable and resilient members, said members normally holding the splines of the section in offset relation but being yieldable to permit sufficient relative rotation between the sections to bring said splines into alignment so as to permit an internally splined workpiece to be slipped onto the arbor and thereafter operative to hold the external splines of the respective sections in pressed engagement with opposite sides of said internal splines, and a pin mounted in the mentioned face of one section projecting into a socket provided in the confronting face of the other section, said socket being wider than said pin and both said pin and said socket mutually co-operating to limit relative rotation between said sections.

8. An arbor for chucking internally splined parts comprising a pair of axially aligned, externally splined sections, and resilient elements interconnecting said sections holding the external splines of one section normally offset with respect to the external splines of the other section and yieldably resisting relative rotation between the sections to bring said splines into alignment.

9. An arbor for chucking internally splined parts comprising a pair of axially aligned, externally splined sections, a shaft supporting said sections for relative rotation, and resilient elements interconnecting said sections holding the external splines of one section normally offset with respect to the external splines of the other section and yieldably resisting relative rotation between the sections to bring said splines into alignment.

10. An arbor for chucking internally splined parts comprising a pair of axially aligned, externally splined sections, a plurality of thin, flexible reeds fixed at opposite ends thereof to said sections, said reeds normally holding the external splines of the sections out of alignment with each other but yieldable to permit said splines to be moved into alignment, and means for preventing said sections from being rotated relative to each other beyond the elastic limits of said reeds.

11. An arbor for chucking internally splined parts comprising a pair of axially aligned, externally splined sections, a shaft extending axially into said sections supporting the same for relative rotational movement, a plurality of thin, flexible reeds disposed concentrically around said shaft and fixed at opposite ends thereof to said sections, said reeds normally holding the external splines of the sections out of alignment with each other but yieldable to permit said splines to be moved into alignment, and means for preventing said sections from being rotated relative to each other beyond the elastic limits of said reeds.

12. An arbor for chucking internally splined parts comprising a pair of axially aligned, externally splined sections, a plurality of thin, flexible reeds fixed at opposite ends thereof to said sections, said reeds normally holding the external splines of the sections out of alignment with each other but yieldable to permit said splines to be moved into alignment, and cross pins connecting opposite ends of the shaft to respective splined sections, at least one of said pins extending into oversized holes provided in the section with which it is associated and coactive with said holes to prevent said sections from being rotated beyond the elastic limits of said reeds.

13. An arbor for chucking internally splined parts comprising a pair of axially aligned, externally splined sections, a shaft extending axially into said sections supporting the same for relative rotational movement, a plurality of thin, flexible reeds disposed concentrically around said shaft and fixed at opposite ends thereof to said sections, said reeds normally holding the external splines of the sections out of alignment with each other but yieldable to permit said splines to be moved into alignment, and cross pins connecting opposite ends of the shaft to respective splined sections, at least one of said pins extending into oversized holes provided in the section with which it is associated and coactive with said holes to prevent said sections from being rotated beyond the elastic limits of said reeds.

14. An arbor for chucking internally splined parts comprising a pair of spaced, axially aligned, externally splined sections, and an annular series of resilient elements interconnecting and formed integrally with said sections, said resilient elements holding the external splines of the sections normally offset with respect to each other and yieldably resisting rotative movement of one section relative to the other.

15. An arbor for chucking internally splined workpieces comprising a pair of hollow, externally splined sections joined by an annular series of integral, flexible and resilient reed members, said reed members holding the splined sections in coaxial relation and with the splines of one section normally offset circumferentially with respect to the splines of the other section, one of said splined sections being rotatable relative to the other splined section against the action of said reed members to bring the splines of both sections into alignment.

16. An arbor for chucking internally splined workpieces comprising a pair of hollow, externally splined sections joined by an annular series of integral, flexible and resilient reed members, said reed members holding the splined sections in coaxial relation and with the splines of one section offset circumferentially with respect to the splines of the other section, one of said splined sections being rotatable relative to the other of said splined sections against the resilient action of said reed members to bring the splines of both sections into alignment, a shaft extending between said splined sections and projecting into the hollow interiors thereof, and cross pins connecting the projecting ends of the shaft to respective splined sections, at least one of said cross pins loosely fitting at least one of the parts with which it is associated so as to permit sufficient rotative movement between the sections to bring said splines into alignment but preventing relative rotation thereof beyond the elastic limits of said reed members.

17. An arbor for chucking internally splined parts comprising a pair of axially aligned, externally splined sections, one of said sections being hollow and having an internal cylindrical bearing, the other of said sections having an axially extending longitudinal shank journaled in and rotatably supported by said bearing, a portion of said shank projecting beyond said bearing constituting a torsion bar and terminating in a threaded stud portion engaging internal threads of said section, and a lock screw also threaded in said section butting against said stud portion to hold the latter normally against rotation in said splined section.

18. An arbor for chucking internally splined parts comprising a pair of axially aligned, externally splined sections, one of said sections being hollow and having an internal cylindrical bearing, the other of said sections having an axially extending longitudinal shank journaled in and rotatably supported by said bearing, a terminal portion of said shank projecting beyond said bearing being torsionally flexible and resilient, and rotatably adjustable means immovably securing the distal end of said terminal portion to said splined section.

19. An arbor for chucking internally splined parts comprising a pair of axially aligned, externally splined sections normally disposed with the splines circumferentially offset with respect to each other, one of said sections being hollow and having an internal cylindrical bearing, the other of said sections having an axially extending longitudinal shank journaled in and rotatably supported by said bearing, a rotatably flexible and resilient reed on the distal end of said shank, and means securing the terminal portion of said reed to said splined section whereby to hold the connected portion of the reed against rotation, said splined sections being relatively rotatable against the resilient action of said reed to bring the external splines thereof into alignment so as to receive an internally splined part, and said reed being operative to press the splines of said sections in opposite directions against the internal splines of the part whereby to hold the same securely on said arbor.

20. An arbor for chucking externally toothed parts comprising a pair of aligned internally toothed sections, torsionally distortable resilient elements interconnecting said sections and operative to yieldably resist relative rotational movement between the sections.

21. An arbor for chucking splined workpieces comprising a pair of splined sections, a plurality of flexible reeds interconnecting said sections and holding the splines of one section normally out of alignment with the splines of the workpiece to be engaged thereby when said workpiece is engaged by the splines of said other section, whereby said reeds must be torsionally deflected to engage the splines of said workpiece with both of said splined sections and, after such engagement, are operative by inherent resiliency thereof to hold the workpiece chucked by said sections.

22. An arbor for chucking splined workpieces comprising a pair of splined sections, a plurality of flexible reeds interconnecting said sections and holding the splines of one section normally out of alignment with the splines of the workpiece to be engaged thereby when said workpiece is engaged by the splines of said other section, whereby said reeds must be torsionally deflected to engage the splines of said workpiece with both of said splined sections and, after such engagement, are operative by inherent resiliency thereof to hold the workpiece chucked by said sections, and an ejector arranged for engagement by the workpiece when the latter is loaded in the chuck and operative to eject said workpiece from engagement by the chuck sections when the part is released by said sections.

23. An arbor for chucking a splined part comprising a pair of toothed sections adapted to interfit with splines on said part, and means interconnecting said sections holding the same in axial alignment and permitting limited rotation therebetween, said means holding said sections with the teeth thereof normally offset so that the teeth of both sections normally cannot be engaged simultaneously with the splines of said part and including at least one torsionally distortable resilient member which is torsionally yieldable to bring said teeth sufficiently into alignment to interfit simultaneously with said splines and thereafter is operative by inherent resiliency to press the teeth of said sections oppositely against said splines to hold said part securely but releasably associated with said arbor.

References Cited in the file of this patent

UNITED STATES PATENTS

| | | |
|---|---|---|
| 2,487,934 | Mastropole | Nov. 15, 1949 |
| 2,507,999 | Schjolin | May 16, 1950 |